United States Patent
Weisz

[11] 4,020,375
[45] Apr. 26, 1977

[54] DYNAMOELECTRIC MACHINE COIL

[75] Inventor: Robert O. Weisz, Fort Wayne, Ind.

[73] Assignee: Essex International, Inc., Fort Wayne, Ind.

[22] Filed: June 15, 1973

[21] Appl. No.: 370,201

[52] U.S. Cl. .......................... 310/208; 174/110 P; 336/222
[51] Int. Cl.² .......................................... H02K 3/04
[58] Field of Search ................ 310/208; 174/110 P, 174/117 A, 117 F, 110 N, 124 R; 336/222

[56] References Cited
UNITED STATES PATENTS

| | | | |
|---|---|---|---|
| 591,997 | 10/1897 | Bishop | 174/110 P |
| 2,361,374 | 10/1944 | Abbott | 174/117 FF |
| 3,621,119 | 11/1971 | Sugiyama | 174/117 A |
| 3,842,192 | 10/1974 | Hilker | 174/120 |

OTHER PUBLICATIONS

Copaco–125 Superstretch Brochure of Cottrell Paper Co. Inc., Rock City Falls, N.Y.
"Nomex" DuPont Brochure Received 12/69.
Electrical Insulation Conference Exhibits Ref. Book, pp. 1–2, Sept. 1969.
Handbook Chemistry & Physics Chem Rurrer Cleveland, 47 Edition 1966–1967.

Primary Examiner—E. A. Goldberg
Attorney, Agent, or Firm—Robert D. Sommer; Lawrence E. Freiburger

[57] ABSTRACT

The conductor wire in a dynamoelectric machine armature and the like is insulated by a single ply longitudinal wrapping of insulating material stretchable at least 12% in a longitudinal direction and at least 8% in a transverse direction without rupturing. The edges of the longitudinal wrapping are overlapped and adhesively bonded together.

4 Claims, 3 Drawing Figures

U.S. Patent  April 26, 1977  4,020,375
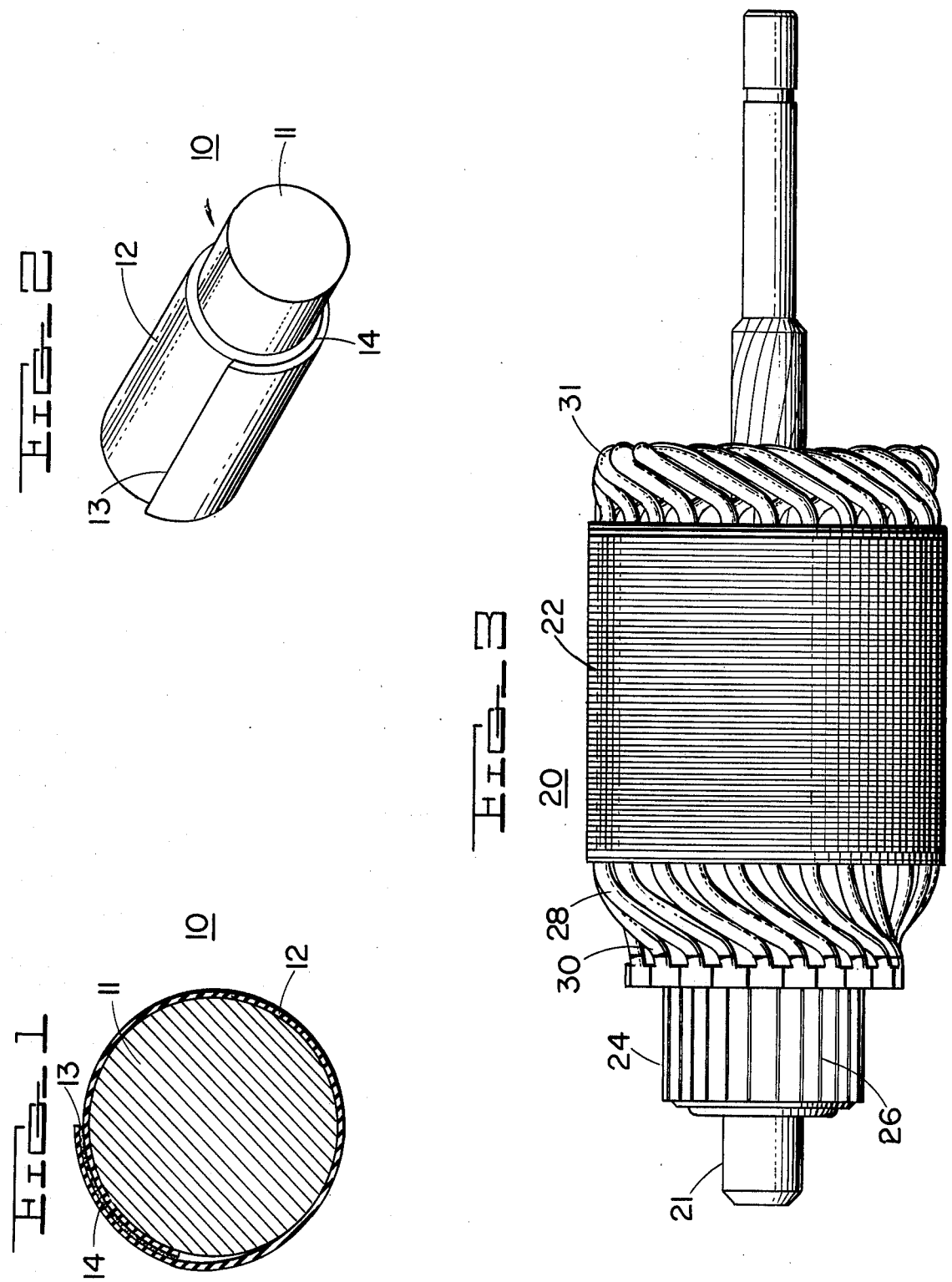

DYNAMOELECTRIC MACHINE COIL

BACKGROUND AND SUMMARY OF THE INVENTION

This invention pertains to an improved insulated electrical conductor for use in dynamoelectric machines and also to dynamoelectric machine coils utilizing the insulated conductor of the present invention.

It has long been recognized that the insulated wire used in winding electric motor armatures should be capable of bending fairly sharply without breaking or cracking the insulation. For example, in winding the armature for an internal combustion engine starter motor a standard test has been employed to determine whether an insulated wire can withstand these bends. This simple test comprises wrapping the insulated wire around a mandrel having a diameter six times the diameter of the wire. If the insulation cracks or breaks while wrapping the insulated wire around the mandrel, the wire is not suitable for use in a starter motor armature.

Proposals have been made in the past which, in fact, do provide an insulated wire having insulation flexible enough for use in winding armatures. One such proposal has been a spirally wrapped paper insulated wire. This type of wire insulation owes its flexibility to the fact that each single turn of the spiral wrap is free to move as the wire is bent.

It has been found that when a spirally wrapped paper insulated wire is used in an armature winding, the wire might be exposed at some of the sharper bends due to the fact that the two turns adjacent the bend will tend to slip away from the bend. In order to overcome this problem, it has been necessary to overlap the spiral wrappings a great deal. By doing this, more paper is used in insulating the wire resulting in high cost.

Longitudinal wrappings of crepe paper have long been used for insulation of straight electrical wires. However, this type of insulated wire has not been considered suitable for armature windings because the paper insulation tears when the wire is bent in forming winding coils with end loops. Since armature coils are compactly fitted together in side-by-side relation, ruptured or weakened insulation is apt to result in a winding failure. While there are other materials such as woven fabrics which are stronger than paper, these materials have various disadvantages such as higher cost, greater thicknesses, difficulty of application.

In accordance with the present invention, the properties of conductors insulated with a single ply longitudinal wrapping of a non-woven, non-crepe sheet insulation material are significantly improved by use of an insulation wrapping of a material which is stretchable to an extent of at least 12% in a longitudinal direction axially parallel with the conductor and to an extent of at least 8% in a transverse direction without rupturing. A rag paper having such stretching characteristics is particularly useful for the insulation of solid wires having a cross-sectional area of at least 0.0025 square inches, particularly round wires of a size in the range of No. 15 A.W.G to No. 6 A.W.G. A tape of this material is longitudinally wrapped in tubular form around the conductor with the edges of the sheet overlapping and adhesively bonded to each other. The inside surface of the tape is in contact with the conductor and is free throughout its length for longitudinal movement on the conductor. Such improved insulated conductors successfully pass the above-described mandrel test and are quite suitable for use as motor armature coils having sharply bent end loops.

Thus, it is an object of the present invention to provide an electrical conductor insulated with a longitudinally wrapped tape which is useful in coils for electric motor armatures and the like.

BRIEF DESCRIPTION OF THE DRAWINGS

FIG. 1 is a cross sectional view of an insulated wire of the present invention;

FIG. 2 is a perspective view of a wire constructed in accordance with the present invention;

FIG. 3 is an elevational view of an electric motor armature employing a winding with the wire of the present invention.

DESCRIPTION OF THE PREFERRED EMBODIMENT

Referring to the drawing figures and particularly FIGS. 1 and 2, there is shown a paper insulated wire generally indicated by reference numeral 10. The wire comprises a round electrical conductor 11 and a longitudinally wrapped paper tape 12 surrounding the conductor 11. The tape is wrapped in an overlapping manner such that a seam 13 is formed which extends lengthwise along the conductor. An adhesive 14 applied only between the overlapping edges of the tape securely bonds the overlapping edges to each other to form a tubular enclosure. The tape 12 has its inside surface in contact with the conductor 11 and is free throughout its length for longitudinal movement on the conductor. The tape 12 is thus free to slide upon the conductor 11 to permit elongation and wrinkling of the tape at sharply bent portions of the wire 10 and to facilitate stripping of the tape at terminal ends of the wire 10.

The paper tape 12 may be wrapped about the wire 11 and the adhesive applied to the seam 13 of the wrapping by any conventional means. Such conventional means usually feeds the wire and the paper tape from separate reels and by the use of a forming die or the like the paper is formed about the conductor. Adhesive may then be applied to the seam and any suitable means used to hold the seam in place while the adhesive sets.

As previously stated, it is essential that the tape 12 have certain minimum stretching characteristics to avoid rupture of the tape when the insulated wire 10 is formed into a coil for a motor armature. The tape 12 must be stretchable to an extent of at least 12% in a longitudinal direction axially parallel with the conductor 11 without breaking. In addition, the tape must be stretchable to an extent of at least 8% in a transverse direction normal to the conductor 11 without breaking. One suitable material with these stretching characteristics is a rag paper supplied by the Cottrell Paper Co., Inc., as its "COPACO 125" paper. It has been found that a 5 mil thick tape of this paper has a 14% stretch in the machine direction and a 10% stretch in the cross direction. In addition to the desired stretching characteristics, this material has superior properties of impact and cutting resistance.

It should be emphasized that although the "COPACO 125" paper is a rag paper, not all rag papers are suitable. For example the "COPACO 125" paper obtains its stretch from the process which is used to make it. Other rag papers made by different processes have proved to be entirely unsatisfactory for use as insulating papers on wires which are to be used in armatures, transformers and the like. The important requisite in choosing the insulating tape is that the material have at least 12% stretch in the machine direction and at least 8% stretch in the cross direction.

Another suitable material with the desired stretching characteristics is a calendered paper composed of aromatic polyamide fibers and fibride which is supplied by E. I. du Pont de Nemours & Company, Inc. as its "Nomex" paper. A tape of this material 3 mils thick stretches 14% in the machine direction and 10% in the cross direction without rupture. However, such material of two mils thickness cannot be similarly stretched without rupture and is unsatisfactory for insulated conductors subjected to fairly sharp bends. Although more expensive than the "COPACO 125" paper, the "Nomex" paper has superior high temperature properties which make wire insulated with it in accordance with the present invention especially useful for windings of dry type power transformers.

Shown in FIG. 3 is an elevational view of an armature having coils of No. 8 A.W.G. round copper wire each insulated with a single ply longitudinal wrapping of an 0.005 inch thick tape of "COPACO 125" paper with an overlap of about 0.090 inch as described above in connection with FIGS. 1 and 2. The armature shown is of the type used in automobile starter motors and it should be understood that armatures for other types of dynamoelectric machines may be constructed using electrical conductors insulated in accordance with the present invention. The armature 20 includes a shaft 21 upon which is mounted a conventional laminated core 22 of magnetic material and a conventional commutator assembly 24 comprising a number of insulated segment bars 26. The core 22 is provided with a number of circumferentially spaced longitudinal slots or bores (not shown) in which the coil conductors 28 are arranged in side-by-side relation. It should be recognized that depending on the type of winding pattern used, the coil conductors 28 may have sharp bends. The coil conductors 28 may have bent terminal portions 30 adjacent their connections to the commutator assembly 24 as well as bent end loops 26 which are in successive engagement with one another. After assembly of the coil conductors 28 in the core 22, the core with its winding of coil conductors may be impregnated with a suitable varnish.

The present invention thus provides an insulated electrical conductor and coils made therefrom for use in electric motor armatures and other dynamoelectric machines which have good electrical properties, and which are inexpensive and easy to manufacture. It will be recognized that more than one wrapping of tape about a conductor may be employed when a greater dielectric strength is desired. As in the case of a single wrapping, the outer marginal portion of the tape is adhesively bonded to an inner first-wrapped portion of the tape.

What is claimed is:

1. In a dynamoelectric machine coil including an insulated electrical conductor which has at least one sharp bend, the improvement which comprises the insulated electrical conductor being a metal conductor having a single ply wrapping of electrical insulation material which will withstand bending of the insulated conductor about a mandrel having a diameter of six times the greatest transverse dimension of the conductor without rupture of the wrapping, the wrapping being a non-woven, non-crepe tape longitudinally wrapped in tubular form around the conductor, said tape at least completely encircling said conductor and having a marginal portion overlapping an inner first-wrapped portion to form a longitudinally extending seam, said tape being stretchable to an extent of at least 12% in a longitudinal direction axially parallel with the conductor and to an extent of at least 8% in a transverse direction normal to the conductor without rupture, an adhesive applied only between said overlapping portions of the tape to securely bond said overlapping portions together, and the tape having its inside surface in contact with the conductor and being free throughout its length for longitudinal movement on the conductor.

2. The improvement described in claim 1 wherein said metal conductor is a solid wire having a cross-sectional area of at least 0.0025 square inches, and said tape is a strip of rag paper approximately 0.005 inch thick which is longitudinally stretchable to an extent of about 14% and transversely stretchable to an extent of about 10% without rupturing.

3. In a dynamoelectric machine having a core of magnetic material with winding slots therein and a winding in said winding slots which comprises insulated electrical conductors arranged in side-by-side relation and having sharply bent end loops in successive engagement with each other, the improvement which comprises the insulated conductors each being a metal conductor having a single ply wrapping of electrical insulation material which will withstand bending of the insulated conductor about a mandrel having a diameter of six times the greatest transverse dimension of the conductor without rupture of the wrapping, the wrapping being a non-woven, non-crepe tape longitudinally wrapped in tubular form around the conductor, said tape at least completely encircling said conductor and having a marginal portion overlapping an inner first-wrapped portion to form a longitudinally extending seam, said tape being stretchable to an extent of at least 12% in a longitudinal direction axially parallel with the conductor and to an extent of at least 8% in a transverse direction normal to the conductor without rupture, an adhesive applied only between said overlapping portions of the tape to securely bond said overlapping portions together, and the tape having its inside surface in contact with the conductor and being free throughout its length for longitudinal movement on the conductor.

4. The improvement described in claim 3 wherein said metal conductor is a solid wire having a cross-sectional area of at least 0.0025 square inches, and said tape is a strip of rag paper approximately 0.005 inch thick which is longitudinally stretchable to an extent of about 10% without rupturing.

* * * * *